United States Patent
Tajima

(10) Patent No.: US 12,325,126 B2
(45) Date of Patent: Jun. 10, 2025

(54) INSULATING COVER, BRACKET, ROBOT, WELDING DEVICE, AND ROBOT SYSTEM

(71) Applicant: FANUC CORPORATION, Yamanashi (JP)

(72) Inventor: Yuuki Tajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 181 days.

(21) Appl. No.: 18/253,269

(22) PCT Filed: Dec. 3, 2021

(86) PCT No.: PCT/JP2021/044377
§ 371 (c)(1),
(2) Date: May 17, 2023

(87) PCT Pub. No.: WO2022/124208
PCT Pub. Date: Jun. 16, 2022

(65) Prior Publication Data
US 2024/0017398 A1    Jan. 18, 2024

(30) Foreign Application Priority Data
Dec. 8, 2020  (JP) ................................ 2020-203508

(51) Int. Cl.
*B25J 9/00*  (2006.01)
(52) U.S. Cl.
CPC .................................. *B25J 9/0009* (2013.01)

(58) Field of Classification Search
CPC ....................................................... B25J 9/0009
See application file for complete search history.

(56) References Cited

U.S. PATENT DOCUMENTS

| 5,515,599 | A | | 5/1996 | Best | |
|---|---|---|---|---|---|
| 5,931,047 | A | * | 8/1999 | Ellqvist | B25J 19/0075 901/29 |
| 8,978,508 | B2 | * | 3/2015 | Kume | F16L 3/18 901/29 |
| 11,167,431 | B2 | * | 11/2021 | Shimizu | B25J 19/0025 |
| 12,194,621 | B2 | * | 1/2025 | Nariai | B25J 19/00 |
| 2003/0060929 | A1 | * | 3/2003 | Kullborg | B25J 17/0283 700/245 |
| 2005/0034552 | A1 | * | 2/2005 | Back | B25J 19/0029 74/490.02 |

(Continued)

FOREIGN PATENT DOCUMENTS

| JP | S62142083 A | | 6/1987 |
|---|---|---|---|
| JP | H08047886 A | | 2/1996 |
| JP | 11114873 A | * | 4/1999 |

(Continued)

*Primary Examiner* — Bobby Rushing, Jr.
(74) *Attorney, Agent, or Firm* — Maier & Maier, PLLC

(57) ABSTRACT

An electrically-insulating insulating cover is for a bracket having a hollow structure. The bracket is attached to a tool attachment surface of a hollow arm member, and has a hollow hole that allows a wire body to pass therethrough from a hollow portion in the arm member into an interior of the bracket through an opening on the tool attachment surface. The insulating cover is disposed in the interior of the bracket, and covers both bracket fixtures for fixing the bracket to the tool attachment surface and the hollow hole.

9 Claims, 10 Drawing Sheets

(56) References Cited

U.S. PATENT DOCUMENTS

2017/0072573 A1* 3/2017 Motokado ............ B25J 17/0283
2020/0238543 A1* 7/2020 Shimizu ............... B25J 19/0025

FOREIGN PATENT DOCUMENTS

| JP | H11114873 A | 4/1999 | |
|---|---|---|---|
| JP | 2004306072 A | 11/2004 | |
| JP | 3814241 B2 * | 8/2006 | |
| JP | 2008264997 A | 11/2008 | |
| JP | 2013202697 A | 10/2013 | |
| JP | 5344315 B | 11/2013 | |
| JP | 5568121 B2 * | 8/2014 | ............ H02G 11/00 |
| JP | 2021164966 A * | 10/2021 | .............. B25J 19/00 |

* cited by examiner

INSULATING COVER, BRACKET, ROBOT, WELDING DEVICE, AND ROBOT SYSTEM

TECHNICAL FIELD

The present invention relates to an insulating cover, a bracket, a robot, a welding device, and a robot system.

BACKGROUND

Industrial robots for uses such as welding are provided with an insulating structure that electrically insulates a tool from a robot body in order to prevent current flow from the tool into the robot body (for example, see Japanese Unexamined Patent Application, Publication No. Sho 62-142083, Japanese Unexamined Patent Application, Publication No. 2013-202697, and Japanese Unexamined Patent Application, Publication No. Hei 11-114873). In Japanese Unexamined Patent Application, Publication No. Sho 62-142083, an insulating member is disposed between a robot body and a tool. In Japanese Unexamined Patent Application, Publication No. 2013-202697 and Japanese Unexamined Patent Application, Publication No. Hei 11-114873, a disk-shaped insulating member is disposed between a reduction gear at a distal end portion of a robot body and a wrist flange, and an insulating washer and an insulating collar are disposed between the wrist flange and bolts for fixing the wrist flange to the robot body.

Meanwhile, when a tool is attached to a tool attachment surface of a hollow arm member, there are cases in which a bracket having a hollow structure is used (for example, see Publication of Japanese Patent No. 5344315 and Japanese Unexamined Patent Application, Publication No. Hei 08-047886). The tool attachment surface of the hollow arm member is provided with an opening through which a wire body is led out from the interior of the arm member. In a case in which a tool that does not have a hollow structure is directly attached to the tool attachment surface, the opening is blocked by the tool and the wire body cannot be led out. By using a bracket having a hollow structure, it becomes possible to attach the tool that does not have a hollow structure to the tool attachment surface. In other words, the tool that does not have a hollow structure is attached to the tool attachment surface via the bracket, and the wire body is wired from the opening to the tool through the inside of the bracket.

SUMMARY

An aspect of the present disclosure is an electrically-insulating insulating cover for a bracket having a hollow structure, the bracket being attached to a tool attachment surface of a hollow arm member and having a hollow hole that allows a wire body to pass therethrough from a hollow portion in the arm member into an interior of the bracket through an opening on the tool attachment surface, wherein the insulating cover: is disposed in the interior of the bracket; and covers both a bracket fixture for fixing the bracket to the tool attachment surface and the hollow hole of the bracket.

DETAILED DESCRIPTION OF EMBODIMENTS

An insulating cover, a bracket, a robot, a welding device, and a robot system according to an embodiment of the present disclosure will be described below with reference to the drawings.

Figure 1:
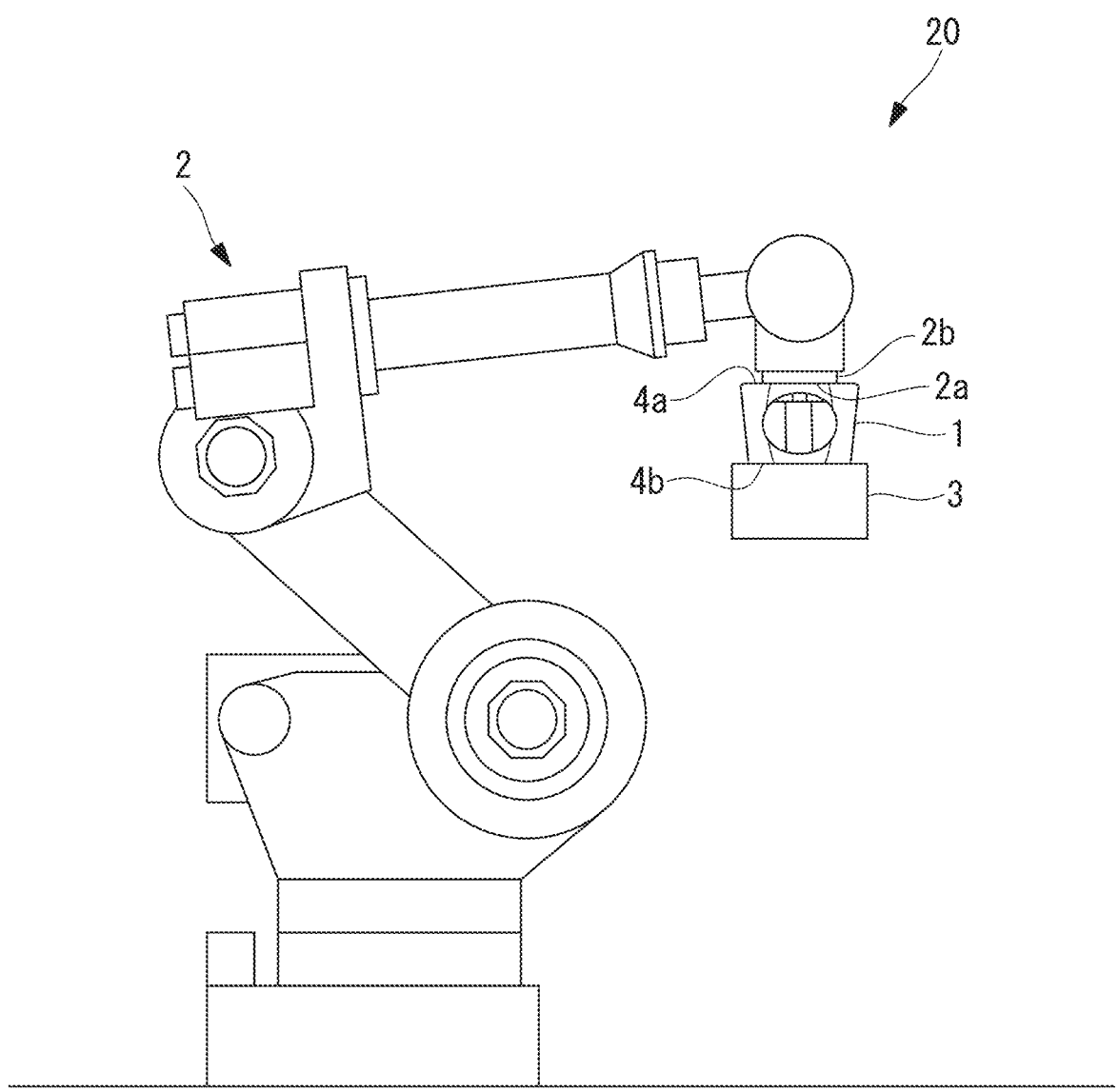
FIG. 1 is an overall configuration diagram of a robot according to an embodiment of the present disclosure.

As shown in FIG. 1, a robot 20 is an industrial robot including a robot body 2 and a bracket 1 having a hollow structure, which can be attached to a tool attachment surface 2a of the robot body 2.

The robot body 2 has at least one arm member. A distal end surface of a most distal arm member 2b of the robot body 2 serves as the tool attachment surface 2a to which a tool 3 or the bracket 1 is attached. The tool attachment surface 2a is provided with a plurality of bolt holes 2c (see FIG. 4) for fixing bolts that fix the tool 3 or the bracket 1 to the tool attachment surface 2a.

The most distal arm member 2b is hollow, and a hollow portion 2d (see FIG. 4) in the arm member 2b has an opening on the tool attachment surface 2a. For example, in a case in which the robot body 2 is a six-axis vertical articulated robot, the arm member 2b is a cylindrical member that rotates about a sixth axis. A wire body A for supplying power and signals etc. to the tool 3 is wired in the hollow portion 2d, and the wire body A is led out from the opening on the tool attachment surface 2a to the outside of the arm member 2b.

In a case in which a tool 3 that does not have a hollow structure is directly attached to the tool attachment surface 2a, the opening of the hollow portion 2d is blocked by the tool 3 and the wire body A cannot be led out from the hollow portion 2d. Because of this, it is not possible to directly attach the tool 3 that does not have a hollow structure to the tool attachment surface 2a. The bracket 1 is used to allow the tool 3 that does not have a hollow structure to be attached to the tool attachment surface 2a. The bracket 1 may be provided as a part of a robot system including the robot 20 and the tool 3.

Figure 2:
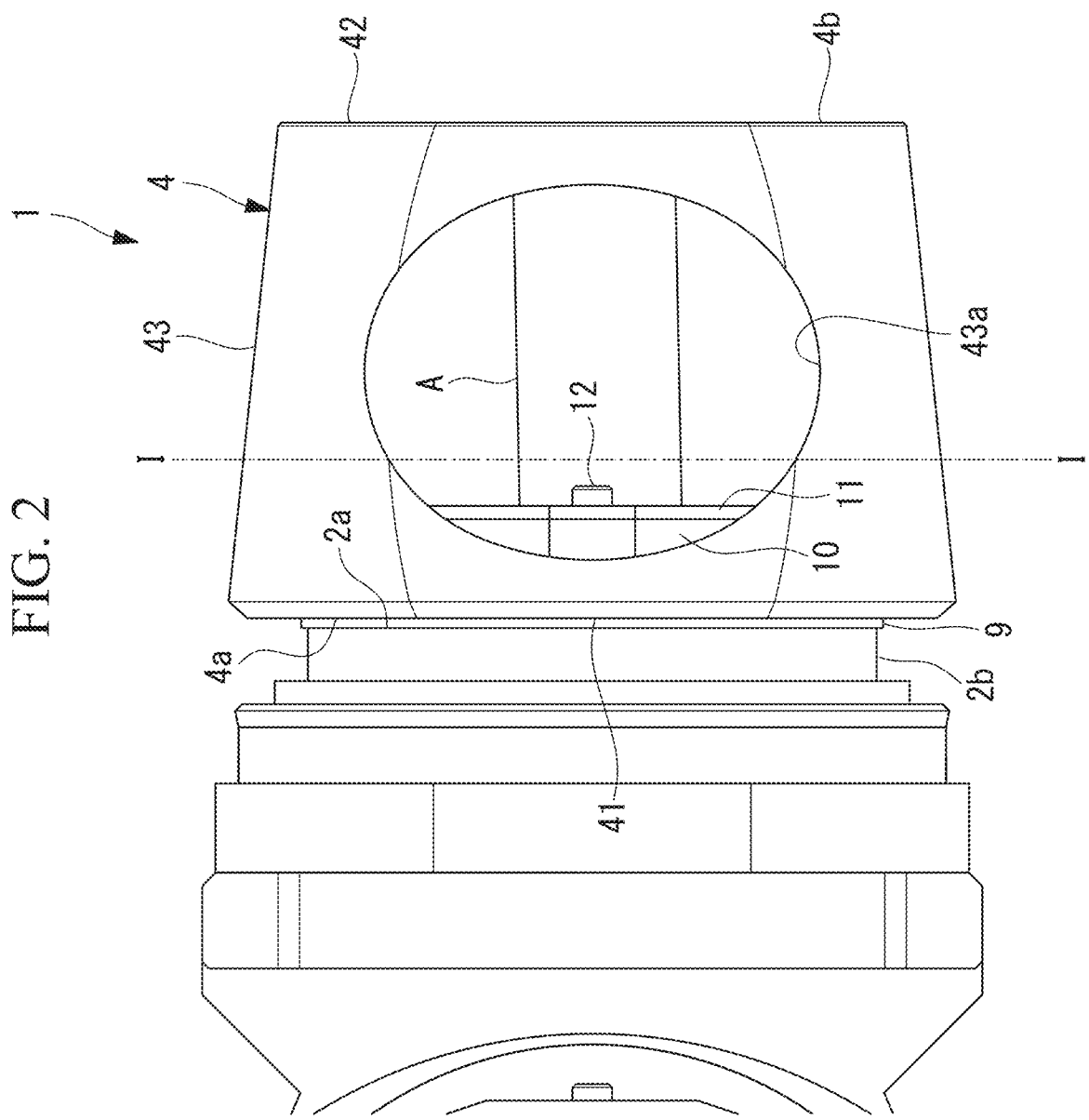
FIG. 2 is a side view of a bracket attached to a tool attachment surface of a robot body.
Figure 3:
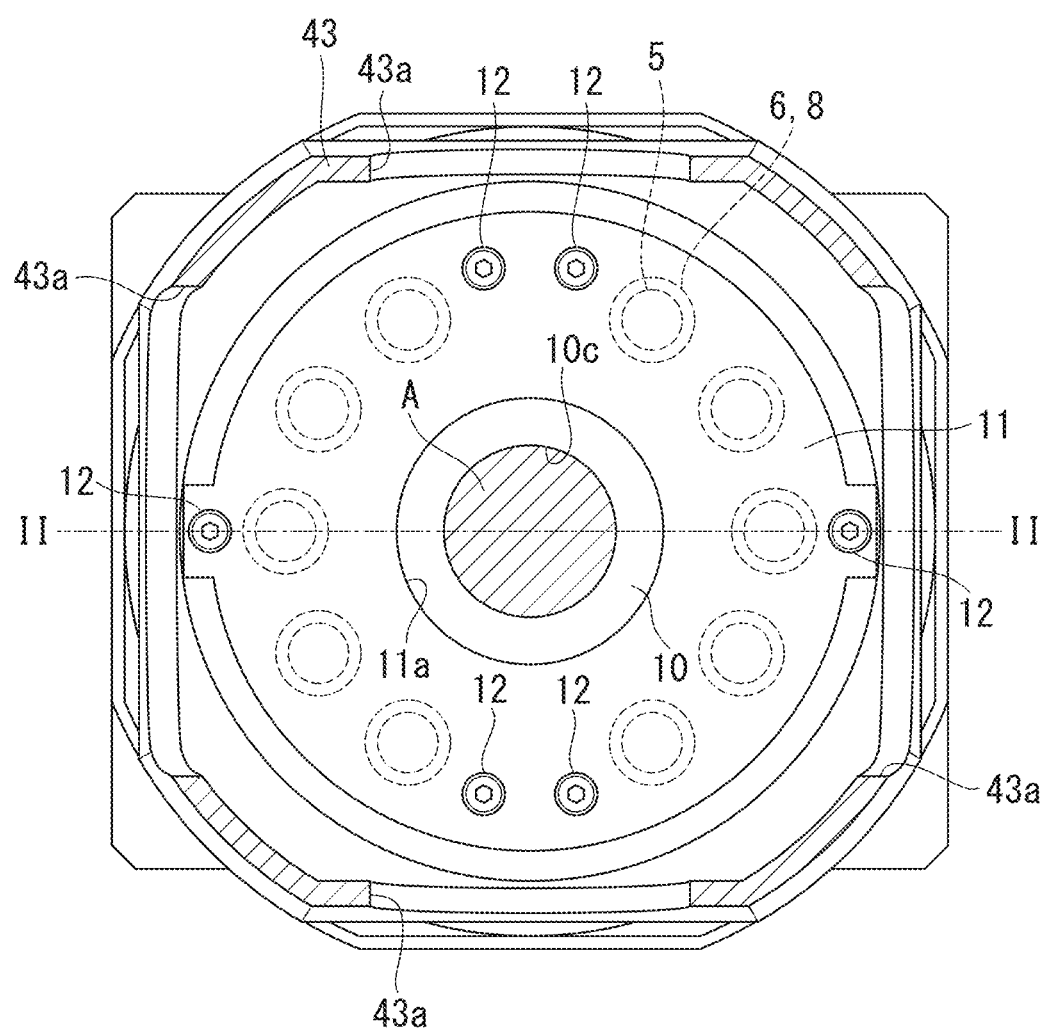
FIG. 3 is a cross-sectional view of the bracket, taken along the I-I line in FIG. 2.
Figure 4:
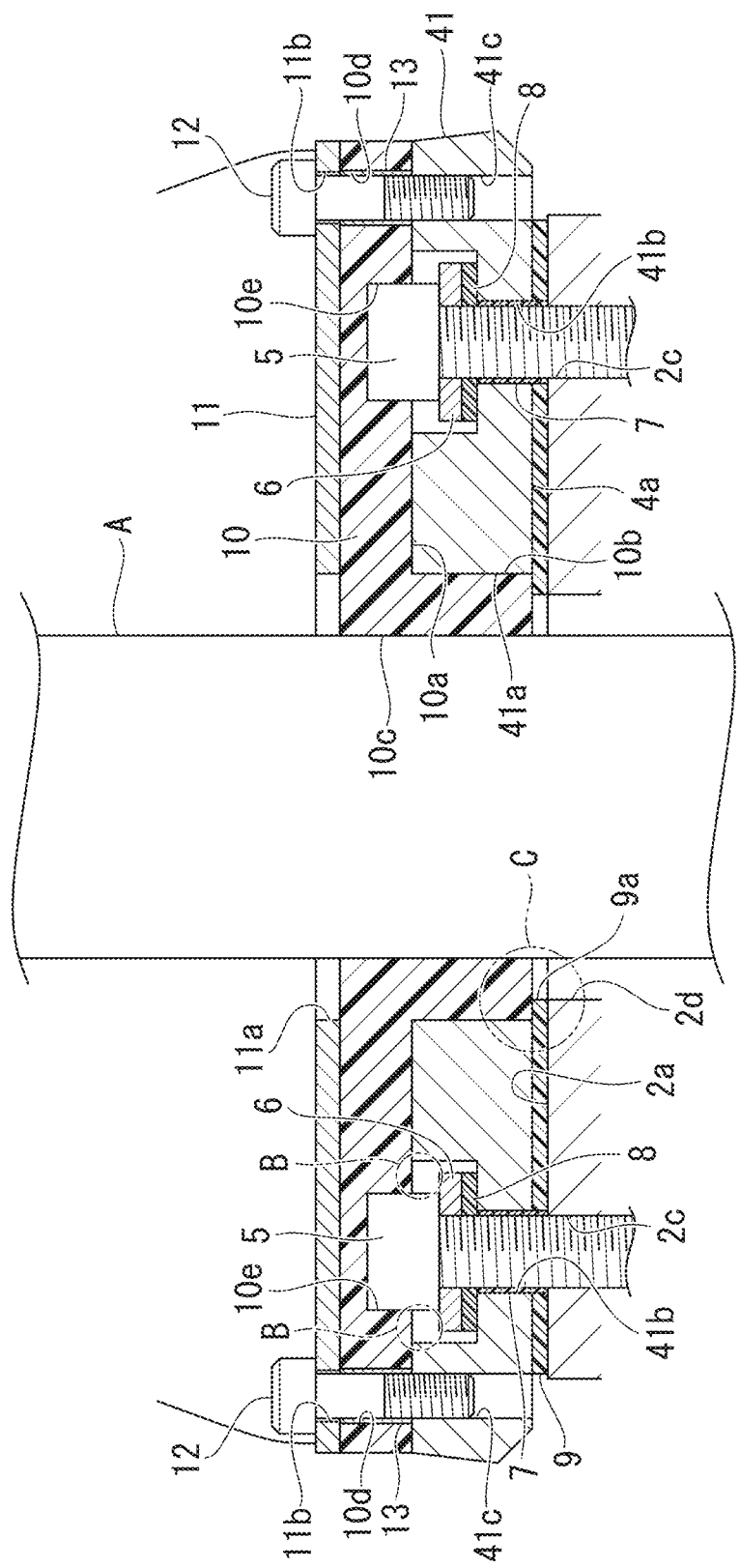
FIG. 4 is a partial longitudinal sectional view of the bracket, taken along the II-II line in FIG. 3.

As shown in FIGS. 2 to 4, the bracket 1 includes: a bracket body 4 having a hollow structure, which includes a robot attachment surface 4a and a tool attachment surface 4b; bracket fixtures 5, 6 that fix the bracket body 4 to the tool attachment surface 2a from the inside of the bracket body 4; and insulating members 7, 8 that electrically insulate the bracket 1 from the robot body 2. The insulating member 7 and the insulating member 8 may be integrated together.

An electrically-insulating insulating plate 9 is disposed between the tool attachment surface 2a and the bracket body 4. The insulating plate 9 has, at a position opposing the opening of the hollow portion 2d, a hollow hole 9a penetrating the insulating plate 9 in the thickness direction. The insulating plate 9 may be provided as a part of the robot body 2 or a part of the bracket 1. The insulating plate 9 may be integrated with the insulating member 7.

The bracket body 4 is a box-shaped member and has: a flat plate-shaped base end wall 41 and a flat plate-shaped distal end wall 42 that face each other; and a tubular side wall 43 that connects the base end wall 41 and the distal end wall 42. The robot attachment surface 4a is an outer surface of the base end wall 41, disposed on the tool attachment surface 2a side, and the tool attachment surface 4b is an outer surface of the distal end wall 42, disposed on the side opposite to the tool attachment surface 2a.

The base end wall 41 has, at a position opposing the opening of the hollow portion 2d, a hollow hole 41a penetrating the base end wall 41 in the thickness direction, and the hollow portion 2d of the arm member 2b communicates with an internal space of the bracket 1 through the hollow holes 41a, 9a. The wire body A is wired from the opening of the hollow portion 2d into the interior of the bracket 1 through the hollow holes 9a, 41a.

The base end wall 41 has, in the periphery of the hollow hole 41a, a plurality of through-holes 41b penetrating the base end wall 41 in the thickness direction. The respective through-holes 41b are provided at positions corresponding to the bolt holes 2c. The bracket body 4 is fixed to the tool attachment surface 2a by fastening fixing bolts 5 into the bolt holes 2c from the inner side of the base end wall 41 through the through-holes 41b. If necessary, metal washers 6 are disposed between the fixing bolts 5 and the base end wall 41.

The distal end wall 42 may have a window 42a (see FIG. 9) that penetrates the distal end wall 42 in the thickness direction and that allows the wire body A to pass therethrough. In a case in which the tool 3 has a hollow structure, the wire body A is connected to the tool 3 attached to the tool attachment surface 4b through the window 42a.

The side wall 43 has at least one window 43a that penetrates the side wall 43 in the thickness direction and that allows the wire body A to pass therethrough. In a case in which the tool 3 does not have a hollow structure, the wire body A is led out to the outside of the bracket 1 through the window 43a and is connected to the tool 3.

As described above, the bracket fixtures include the plurality of fixing bolts 5. If necessary, the metal washers 6 may be used together with the respective fixing bolts 5. The fixing bolts 5 and the metal washers 6 are formed from a high-strength material and are, for example, made of steel.

The insulating members are cylindrical insulating sleeves 7 and annular plate-shaped insulating washers 8, and are formed from an electrically insulating material, such as a resin. The insulating sleeves 7 are disposed between the inner surfaces of the through-holes 41b and the outer surfaces of the fixing bolts 5, and the insulating washers 8 are disposed between the inner surface of the base end wall 41 and the metal washers 6. The insulating sleeves 7 and the insulating washers 8 electrically insulate the fixing bolts 5 and the metal washers 6 from the bracket body 4, and thus, an electric current is prevented from flowing into the robot body 2 from the bracket body 4 via the fixing bolts 5 and the metal washers 6.

Because the internal space of the bracket body 4 is exposed to the exterior of the bracket 1 via the window 43a, foreign matter, such as spatter, having lower electrical insulation than air may enter inside the bracket body 4 from the exterior thereof, and the foreign matter may adhere to the inner side of the bracket body 4. In the case in which the hollow hole 41a of the base end wall 41 and the bracket fixtures 5, 6 are exposed, there is a possibility that the adhesion of the foreign matter causes a decrease in electrical insulation between the bracket fixtures 5, 6 and the bracket body 4, and between the bracket body 4 and the arm member 2b. In order to prevent such an unintended decrease in electrical insulation, the bracket 1 is further provided with an electrically-insulating insulating cover 10 that is attached to the inner side of the bracket body 4.

Figure 5:
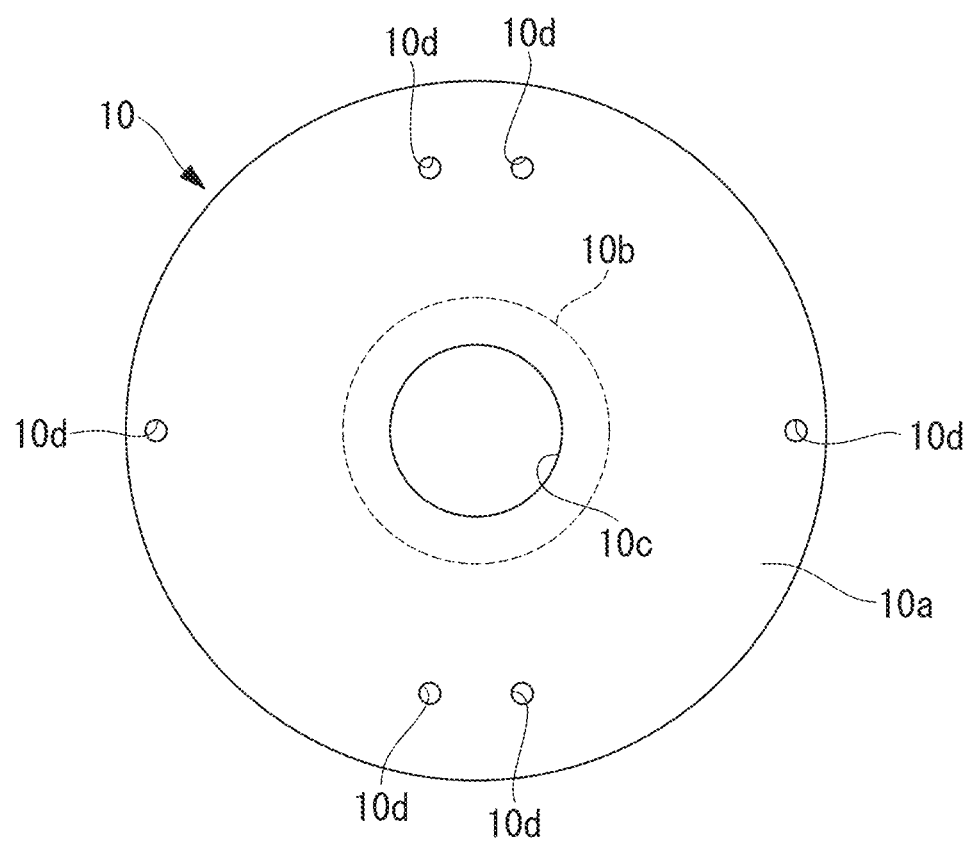
FIG. 5 is a front view of an insulating cover, as viewed from a distal end side.

The insulating cover 10 is preferably elastically deformable and is, for example, a sponge. As shown in FIGS. 3 to 5, the insulating cover 10 has an annular plate-shaped flat portion 10a that is disposed on the inner side of the base end wall 41 (the side opposite to the tool attachment surface 2a) and a cylindrical tube portion 10b that vertically extends from a base end surface of the flat portion 10a and that is disposed in the hollow hole 41a, and a hollow hole 10c through which the wire body A passes penetrates from a base end surface of the tube portion 10b to a distal end surface of the flat portion 10a. The thus-configured insulating cover 10 covers both the fixtures 5, 6 and the hollow hole 41a.

Specifically, as shown in FIG. 3, the flat portion 10a has an area covering most of the inner surface of the base end wall 41, and covers all of the fixing bolts 5 and all of the metal washers 6. The flat portion 10a may cover the entire inner surface of the base end wall 41. The tube portion 10b covers an inner circumferential surface of the hollow hole 41a over the entire circumference thereof, and preferably covers the inner circumferential surface of the hollow hole 41a over the entire length thereof in the depth direction.

In addition, in FIG. 4, the inner diameter of the hollow hole 41a is equal to or larger than the inner diameter of the hollow portion 2d and the inner diameter of the hollow hole 9a, and a peripheral edge portion of the hollow hole 9a is exposed in the hollow hole 41a. An inner circumferential surface of the tube portion 10b (an inner circumferential surface of the hollow hole 10c) is disposed radially inward of an inner circumferential surface of the hollow portion 2d and an inner circumferential surface of the hollow hole 9a, and the tube portion 10b covers the peripheral edge portion of the hollow hole 9a that is exposed in the hollow hole 41a.

It is preferable that the tube portion 10b close a cylindrical gap between the inner circumferential surface of the hollow hole 41a and an outer circumferential surface of the wire body A. For example, the tube portion 10b has an inner diameter smaller than the outer diameter of the wire body A and an outer diameter larger than the inner diameter of the hollow hole 41a, and is also elastically shrinkable in the radial direction. In this case, an outer circumferential surface of the tube portion 10b comes into contact with the inner circumferential surface of the hollow hole 41a and the inner circumferential surface of the tube portion 10b comes into contact with the outer circumferential surface of the wire body A, whereby the gap is closed.

The bracket 1 may be further provided with a presser plate 11 and a plurality of fixing bolts (presser-plate fixtures) 12 for fixing the insulating cover 10 to the bracket body 4.

The presser plate 11 is a hard flat plate and may be made of metal. The presser plate 11 has, at a position corresponding to the opening of the hollow portion 2d, a hollow hole 11a penetrating the presser plate 11 in the thickness direction.

The base end wall 41 is provided with a plurality of bolt holes 41c into which the fixing bolts 12 are respectively fastened, and the insulating cover 10 and the presser plate 11 are respectively provided with through-holes 10d, 11b through which the fixing bolts 12 pass, at positions corresponding to the bolt holes 41*c*. The insulating cover 10 is fixed to the base end wall 41 by fastening the fixing bolts 12 into the bolt holes 41*c* through the through-holes 10*d*, 11*b*. In a case in which the insulating cover 10 is elastically compressible in the thickness direction, the bracket 1 may be further provided with cylindrical spacers 13 that are disposed in the through-holes 10*d* and into which the fixing bolts 12 are inserted.

In a case in which the presser plate 11 is larger than the window 43*a* and it is difficult to make the presser plate 11 pass through the window 43*a*, the presser plate 11 may be divided into a plurality of members. For example, the presser plate 11 may be constituted of two semicircular members. With this configuration, it is possible to easily insert the hard presser plate 11 into the bracket body 4 from the window 43*a*.

Next, the operation of the insulating cover 10, the bracket 1, and the robot 20 will be described.

The tool 3 is attached to the tool attachment surface 4*b* of the bracket body 4 fixed to the tool attachment surface 2*a*. In the case in which the tool 3 has a hollow structure, the wire body A is drawn from the opening of the hollow portion 2*d* of the distal arm member 2*b* into the interior of the bracket body 4, and is connected to the tool 3 through the window 42*a* of the distal end wall 42. In the case in which the tool 3 does not have a hollow structure, the wire body A is led out from inside the bracket body 4 to the exterior of the bracket body 4 through the window 43*a* of the side wall 43 and is connected to the tool 3.

In a case in which the tool 3 is, for example, for welding, there is a possibility that an electric current output from the tool 3 flows into the bracket body 4. With this embodiment, the insulating members 7, 8 and the insulating plate 9 electrically insulate the bracket body 4 from the robot body 2. Therefore, it is possible to prevent the electric current from flowing into the robot body 2 from the bracket body 4.

In addition, in the configuration in which the bracket body 4 having a hollow structure is fixed to the tool attachment surface 2*a* from the inside thereof by means of the fixtures 5, 6, and the wire body A is drawn from the opening of the hollow portion 2*d*, located on the tool attachment surface 2*a*, into the bracket body 4 through the hollow hole 41*a*, there is a possibility that the adhesion of foreign matter, such as spatter, causes a decrease in electrical insulation in regions B and a region C in FIG. 4. In the regions B, a head portion of the fixing bolt 5 and the metal washer 6 are exposed from the base end wall 41 and disposed in a vicinity of the surface of the base end wall 41. In the region C, the inner circumferential surface of the hollow hole 41*a* is disposed in a vicinity of the inner circumferential surface of the exposed hollow portion 2*d*.

With this embodiment, the flat portion 10*a* of the insulating cover 10 that covers the fixtures 5, 6 prevents the foreign matter from adhering to the fixtures 5, 6. With this configuration, it is possible to prevent the fixtures 5, 6 from being electrically connected to the base end wall 41 in the regions B.

In addition, the tube portion 10*b* of the insulating cover 10 that covers the hollow hole 41*a* prevents the foreign matter from adhering to the inner circumferential surface of the hollow hole 41*a* and the inner circumferential surface of the hollow portion 2*d*. With this configuration, it is possible to prevent the inner circumferential surface of the hollow hole 41*a* from being electrically connected to the inner circumferential surface of the hollow portion 2*d* in the region C.

In addition, in the case in which the insulating cover 10 is elastically deformable, it is possible to more reliably prevent the foreign matter, such as spatter, from entering the regions B, C, and to more reliably prevent a decrease in electrical insulation between the bracket body 4 and the robot body 2.

In other words, in a case in which the inner surface of the bracket body 4 has irregularities, for example, in a case in which the inner surface is a casting surface, the flat portion 10*a* deforms along the uneven shape of the inner surface of the base end wall 41, thereby preventing the formation of a gap between the flat portion 10*a* and the inner surface of the base end wall 41. In addition, in the case in which the flat portion 10*a* has an outer diameter larger than the diameter of a circumscribed circle of the plurality of bracket fixtures 5, 6, the formation of a gap between the outer circumferential surface of the flat portion 10*a* and the bracket fixtures 5, 6 is prevented. In addition, in the case in which the tube portion 10*b* has an inner diameter smaller than the outer diameter of the wire body A and an outer diameter larger than the inner diameter of the hollow hole 41*a*, the formation of a gap between the outer circumferential surface of the tube portion 10*b* and the inner circumferential surface of the hollow hole 41*a*, as well as a gap between the inner circumferential surface of the tube portion 10*b* and the outer circumferential surface of the wire body A, is prevented. Accordingly, the insulating cover 10 can reliably block portions from which the foreign matter may enter the regions B, C.

In addition, with this embodiment, the bracket body 4 is electrically insulated from the robot body 2, and thus, electrical insulation between the bracket body 4 and the tool 3 is unnecessary. Therefore, a worker can perform attachment and detachment of the tool 3 with respect to the tool attachment surface 4*b* without requiring additional work for ensuring electrical insulation between the tool 3 and the robot body 2.

The current flow from the tool 3 into the robot body 2 can also be prevented by providing an insulating member between the bracket body 4 and the tool 3. However, in this case, when performing attachment and detachment of the tool 3 with respect to the tool attachment surface 4*b*, the insulating member also needs to be attached and detached, and this increases the number of components to be handled and the amount of work.

In addition, with this embodiment, the bracket 1 itself is provided with an insulating structure that insulates the bracket 1 from the robot body 2, and the bracket 1 is fixed to the tool attachment surface 2*a* with only the thin insulating plate 9 interposed therebetween. With this configuration, it is possible to suppress the offset amount from the tool attachment surface 2*a* to the tool attachment surface 4*b*, the total weight of the members attached to the tool attachment surface 2*a*, and the cost.

It is also possible to electrically insulate the bracket from the robot body 2 by placing an insulating member between the tool attachment surface 2*a* and the bracket, and fixing the bracket to the insulating member instead of the tool attachment surface. However, in this case, a thick insulating member is required, and this increases the offset amount, the total weight, and the cost.

In the abovementioned embodiment, the insulating cover 10 has the tube portion 10*b* that covers the inner circumferential surface of the hollow hole 41*a*; however, in a case in which the hollow hole 41*a* can be covered with only the flat portion 10*a*, the insulating cover 10 need not necessarily have the tube portion 10*b*.

In other words, in the case in which the inner circumferential surface of the flat portion 10a comes into contact with the outer circumferential surface of the wire body A, and the gap between the inner circumferential surface of the hollow hole 41a and the outer circumferential surface of the wire body A is closed by the flat portion 10a, it is possible to prevent the foreign matter from entering the hollow hole 41a only with the flat portion 10a. Therefore, in such a case, the tube portion 10b need not be provided.

Figure 6:
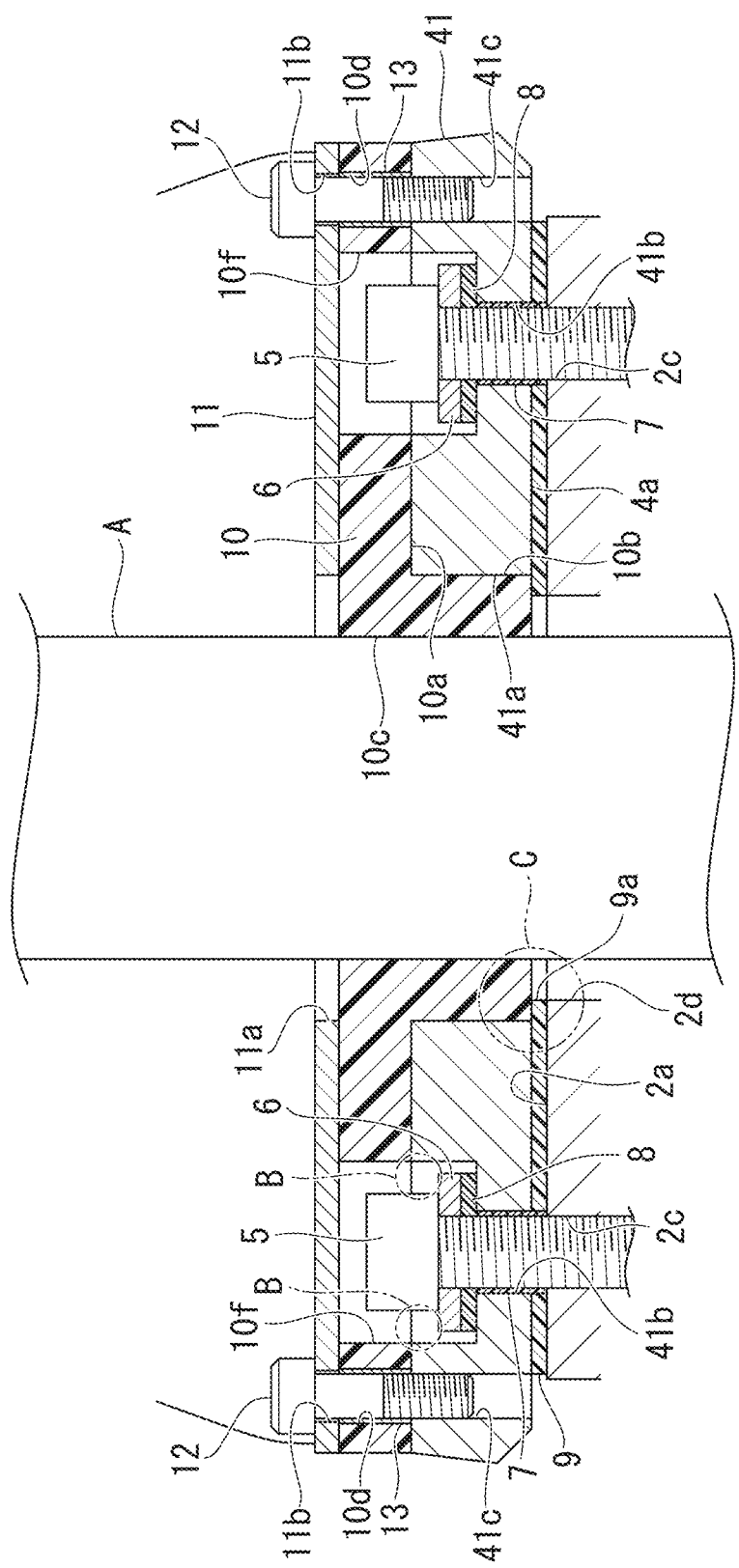
FIG. 6 is a partial longitudinal sectional view of a modification of the bracket.

In the abovementioned embodiment, the flat portion 10a of the insulating cover 10 may not be in contact with the bracket fixtures 5, 6. In other words, as shown in FIG. 6, holes 10f having an inner diameter larger than the outer diameter of the bracket fixture 5 or 6 may be provided in the flat portion 10a, at positions corresponding to the bracket fixtures 5, 6. Also in this configuration in which the flat portion 10a covers the lateral sides of the bracket fixtures 5, 6, the insulating cover 10, the presser plate 11, and the base end wall 41 cover the bracket fixtures 5, 6; therefore, it is possible to prevent the foreign matter from adhering to the bracket fixtures 5, 6.

In the abovementioned embodiment, the insulating cover 10 may not necessarily be elastically deformable. For example, the insulating cover 10 may be formed from a hard material.

In the case in which the insulating cover 10 is an elastically deformable member, such as a sponge, it is possible to easily insert the insulating cover 10 into the bracket body 4 from the window 43a. Meanwhile, in the case in which the insulating cover 10 is not elastically deformable, it may be difficult to make the insulating cover 10 pass through the window 43a. Therefore, the insulating cover 10 may be divided into a plurality of members having such dimensions that the members can pass through the window 43a.

Figure 7:
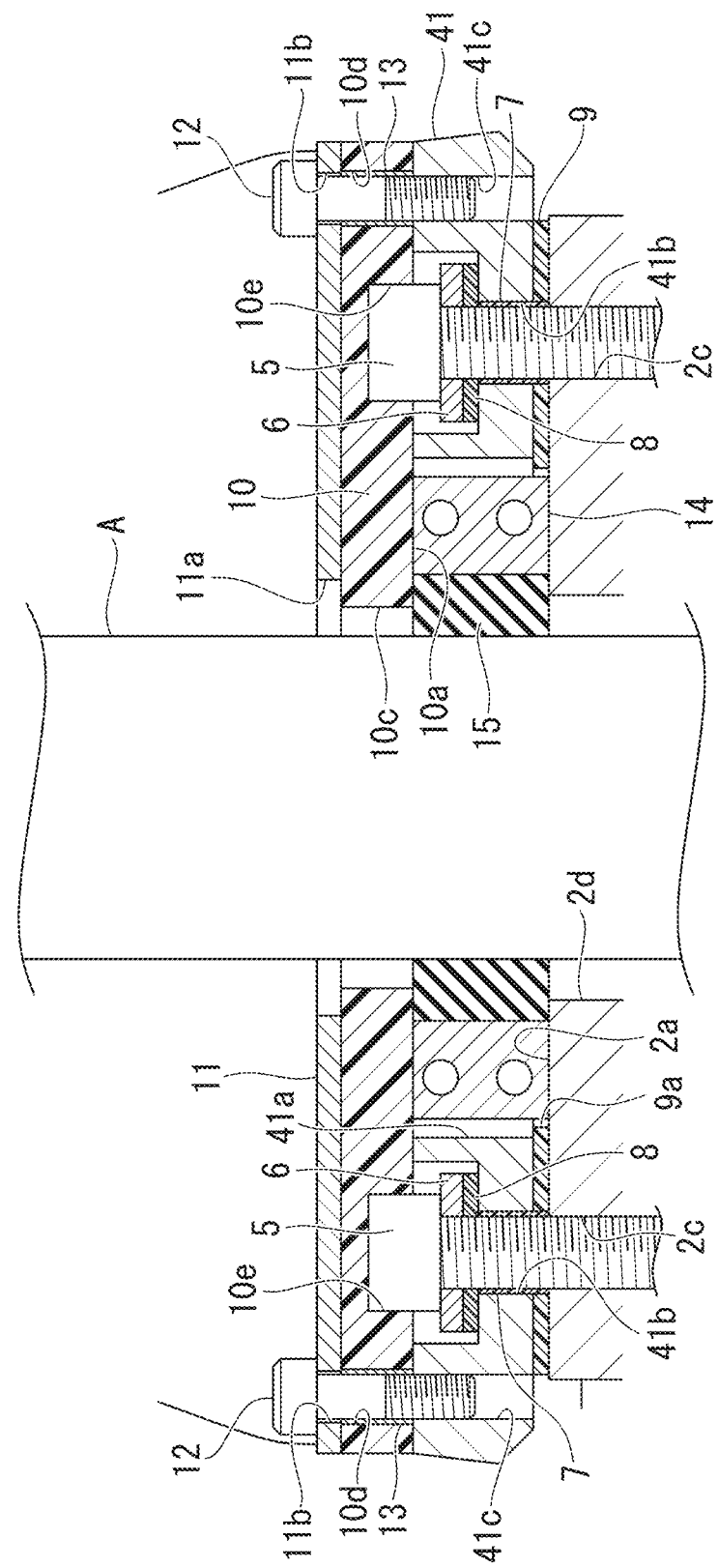
FIG. 7 is a partial longitudinal sectional view of another modification of the bracket.

In the abovementioned embodiment, as shown in FIG. 7, the bracket 1 may be further provided with an annular clamp 14 that is disposed in the hollow hole 41a, and that fixes the wire body A with respect to the tool attachment surface 2a.

Figure 8:
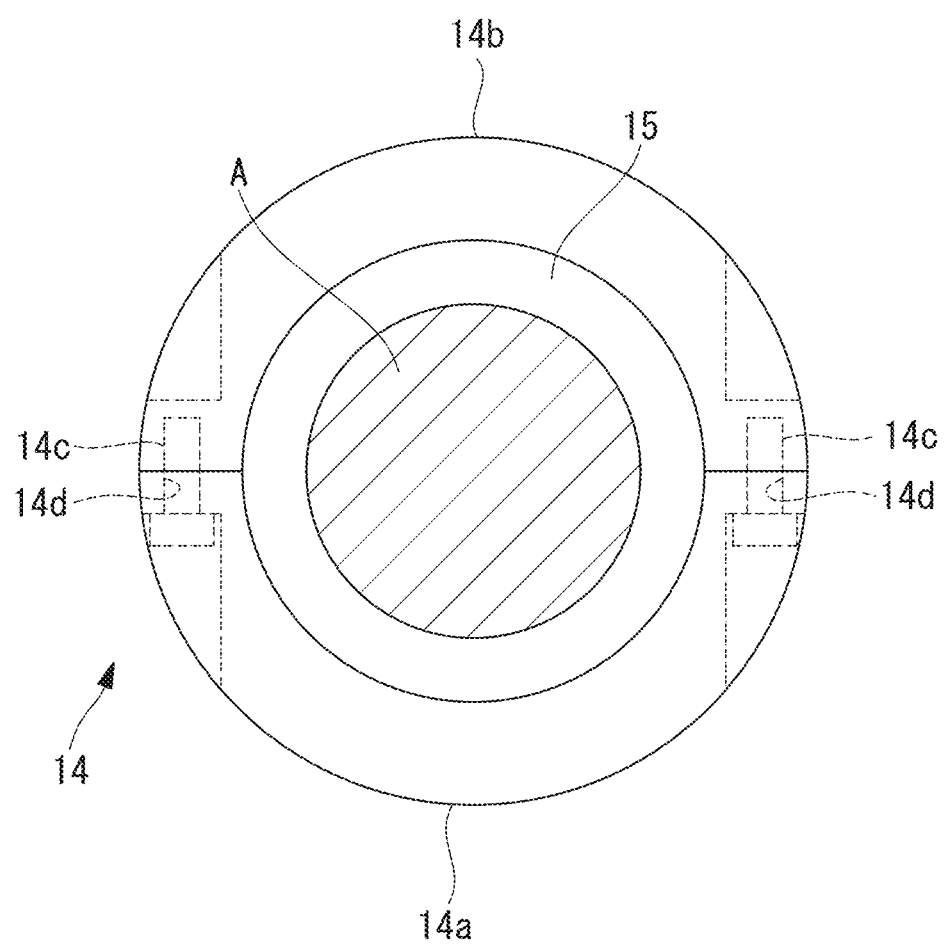
FIG. 8 is a front view of a clamp provided in the bracket in FIG. 7.

As shown in FIG. 8, the clamp 14 has two semicircular components 14a, 14b that sandwich the wire body A in the radial direction. An elastic body 15 is wound around the outer circumferential surface of the wire body A, so that the elastic body 15 is disposed between the wire body A and the clamp 14. The two components 14a, 14b are fixed in close contact with the outer circumferential surface of the wire body A with the elastic body 15 interposed therebetween. The components 14a, 14b are fixed, for example, by screwing bolts 14c into bolt holes 14d of the components 14a, 14b. The clamp 14 is fixed to the tool attachment surface 2a by means of bolts (not shown).

In FIGS. 7 and 8, the gap between the inner circumferential surface of the hollow hole 41a and the outer circumferential surface of the wire body A is closed by the clamp 14 and the elastic body 15; thus, the insulating cover 10 need not have the tube portion 10b. The flat portion 10a extends more radially inward than the inner circumferential surface of the clamp 14 and covers the entire inner side of the clamp 14.

With this configuration, it is possible to suppress movement of the wire body A in the bracket body 4 by fixing the wire body A in the hollow hole 41a of the base end wall 41.

In the abovementioned embodiment, the presser plate 11, the fixing bolts 12, and the spacers 13 are used as fixing means for fixing the insulating cover 10 to the base end wall 41 of the bracket body 4; however, the fixing means could be changed, as appropriate, in accordance with the material or the like of the insulating cover 10. The insulating cover 10 may be fixed to the base end wall 41 by means of a plurality of fixing means.

In an example, in a case in which the insulating cover 10 is a rubber component or a resin component having high rigidity, the insulating cover 10 may be fixed to the base end wall 41 by using only the fixing bolts (cover fixtures) 12, without using the presser plate 11 and the spacers 13. If necessary, washers may be disposed between the fixing bolts 12 and the insulating cover 10.

In another example, as shown in FIGS. 4 and 7, the insulating cover 10 may have, in the surface on the base end wall 41 side, recessed portions 10e into which the head portions of the fixing bolts 5 are fitted, and the insulating cover 10 may be fixed to the base end wall 41 by means of engagement between the head portions of the fixing bolts 5 and the recessed portions 10e.

In another example, the insulating cover 10 may be adhered to the inner surface of the base end wall 41 by means of an adhesive or the like.

Figure 9:
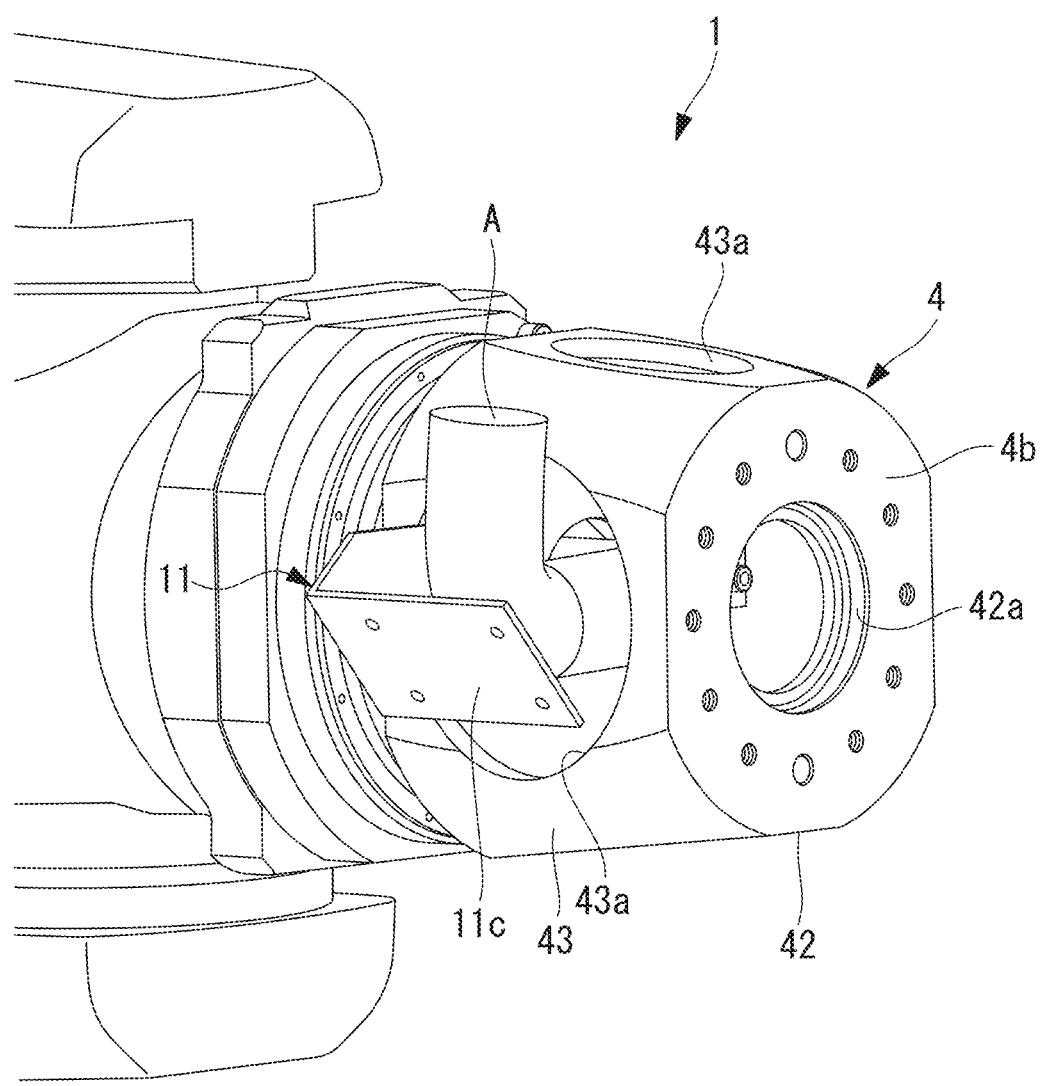
FIG. 9 is a perspective view of another modification of the bracket attached to the tool attachment surface of the robot body.
Figure 10:
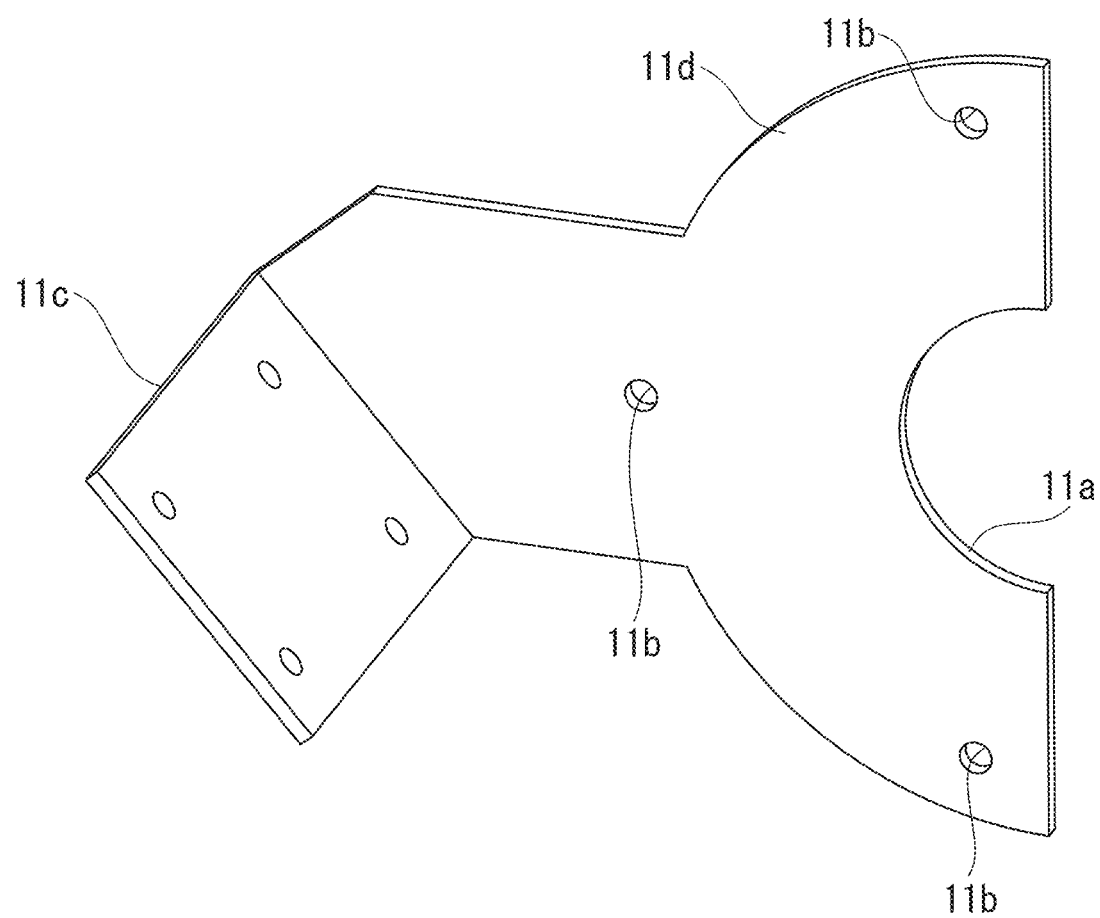
FIG. 10 is a perspective view of a presser plate provided in the bracket in FIG. 9.

In the abovementioned embodiment, as shown in FIGS. 9 and 10, the presser plate 11 may have a wire-body fixing portion 11c for fixing the wire body A to the presser plate 11.

The wire-body fixing portion 11c is, for example, a flat plate-shaped member and is disposed outside the bracket body 4. The wire body A is fixed to the wire-body fixing portion 11c by using, for example, a band. The presser plate 11 in FIG. 10 has two semicircular portions 11d that are arranged in the bracket body 4 and the wire-body fixing portion 11c that is connected to one of the semicircular portions 11d, and the illustration of the other semicircular portion is omitted.

In a case in which the wire body A is movable with respect to the bracket body 4 in accordance with the operation of the robot body 2, there is a possibility that the wire body A comes into contact with the casting surface of the bracket body 4 and an insulating sheath covering the outer side of the wire body A may be damaged. By fixing the wire body A to the presser plate 11 by means of the wire-body fixing portion 11c, it is possible to restrict the movement of the wire body A, thereby preventing breakage of the wire body A.

Although the bracket 1 is used to attach a hollow or solid tool 3 to the hollow arm member 2b in the abovementioned embodiment, alternatively, the bracket 1 may be used to attach a hollow welding tool 3 to a non-hollow arm member 2b. In this case, the bracket 1 may be provided as a part of a welding device. In other words, the welding device includes the bracket 1 and the hollow welding tool 3.

The hollow welding tool 3 is attached to the robot attachment surface 4a in which the hollow hole 41a opens by means of the bracket fixtures 5, 6, and the insulating members 7, 8 electrically insulate the welding tool 3 from the bracket body 4. At least one wire body is wired between a hollow portion of the welding tool 3 and the interior of the bracket body 4 through the hollow hole 41a. The bracket 1 is attached, at the tool attachment surface 4b, to the tool attachment surface 2a of the non-hollow arm member 2b. In this case, the distal end wall 42 need not have the window 42a.

In the abovementioned embodiment, the bracket 1 may be provided as a part of a welding robot system. In other words, the robot system includes the robot 20 having the bracket 1 and the robot body 2, and the welding device having the welding tool 3, such as a welding gun. The welding device is fixed to the distal end of the robot body 2 with the bracket 1 interposed therebetween.

The invention claimed is:

1. A bracket comprising:
a bracket body having a hollow structure which is attached to a distal end surface of a hollow arm member serving as a tool attachment surface, the bracket body having a hollow hole that allows a wire body to pass therethrough from a hollow portion in the arm member into an interior of the bracket body through an opening on the tool attachment surface;
a bracket fixture that fixes the bracket body to the tool attachment surface from an inside of the bracket body;
an insulating member that is disposed between the bracket fixture and the bracket body, and that electrically insulates the bracket fixture from the bracket body; and
an insulating cover that includes a plate-shaped flat portion disposed in the interior of the bracket body and that covers both the bracket fixture and the hollow hole.

2. The bracket according to claim 1,
wherein the flat portion is disposed on an inner surface of the bracket on a side of the tool attachment surface, and
wherein the insulating cover is elastically deformable.

3. The bracket according to claim 1, further comprising:
a presser plate that is disposed on the insulating cover on a side opposite to the tool attachment surface; and
a presser-plate fixture that fixes the presser plate to the bracket body.

4. The bracket according to claim 3, wherein the presser plate has a wire-body fixing portion that fixes the wire body to the presser plate.

5. The bracket according to claim 1, further comprising an annular clamp that is disposed in the hollow hole, and that fixes the wire body with respect to the tool attachment surface.

6. The bracket according to claim 1, further comprising a cover fixture that fixes the insulating cover to the bracket body.

7. The bracket according to claim 1, wherein the insulating cover has a recessed portion into which a head portion of the bracket fixture is fitted, and is fixed to the bracket body by an engagement between the head portion and the recessed portion.

8. The bracket according to claim 1, wherein the insulating cover is adhered to the bracket body.

9. A robot comprising:
a robot body that has at least one arm member and in which a distal arm member is hollow; and
the bracket according to claim 1.

* * * * *